US011784808B2

(12) United States Patent
Sheth et al.

(10) Patent No.: US 11,784,808 B2
(45) Date of Patent: *Oct. 10, 2023

(54) AUTHENTICATION OF NETWORK DEVICES USING ACCESS CONTROL PROTOCOLS

(71) Applicant: Cisco Technology, Inc., San Jose, CA (US)

(72) Inventors: Sujal Sheth, Gujarat (IN); Shwetha Subray Bhandari, Bangalore (IN); Eric Voit, Bethesda, MD (US); William F. Sulzen, Apex, NC (US); Frank Brockners, Cologne (DE)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/659,530

(22) Filed: Apr. 18, 2022

(65) Prior Publication Data

US 2022/0239476 A1 Jul. 28, 2022

Related U.S. Application Data

(63) Continuation of application No. 16/784,025, filed on Feb. 6, 2020, now Pat. No. 11,343,091.
(Continued)

(51) Int. Cl.
*H04L 29/06* (2006.01)
*H04L 9/08* (2006.01)
(Continued)

(52) U.S. Cl.
CPC .......... *H04L 9/0866* (2013.01); *H04L 9/0869* (2013.01); *H04L 9/3242* (2013.01);
(Continued)

(58) Field of Classification Search
None
See application file for complete search history.

(56) References Cited

U.S. PATENT DOCUMENTS

2017/0245184 A1* 8/2017 Nagesh Shetigar ..... H04J 11/00

OTHER PUBLICATIONS

Stumpf, Frederic, et al., "Improving the Scalability of Platform Attestation," STC '08, Fairfax, Virginia, U.S.A., Oct. 31, 2008, pp. 1-10 (Year: 2008).*
(Continued)

*Primary Examiner* — Andrew J Steinle
(74) *Attorney, Agent, or Firm* — Polsinelli

(57) ABSTRACT

Systems, methods, and computer-readable media for authenticating access control messages include receiving, at a first node, access control messages from a second node. The first node and the second node including network devices and the access control messages can be based on RADIUS or TACACS+ protocols among others. The first node can obtain attestation information from one or more fields of the access control messages determine whether the second node is authentic and trustworthy based on the attestation information. The first node can also determine reliability or freshness of the access control messages based on the attestation information. The first node can be a server and the second node can be a client, or the first node can be a client and the second node can be a server. The attestation information can include Proof of Integrity based on a hardware fingerprint, device identifier, or Canary Stamp.

20 Claims, 9 Drawing Sheets

Related U.S. Application Data

(60) Provisional application No. 62/830,036, filed on Apr. 5, 2019.

(51) Int. Cl.
  *H04L 9/32* (2006.01)
  *H04L 9/40* (2022.01)

(52) U.S. Cl.
  CPC ........ *H04L 9/3247* (2013.01); *H04L 63/0869* (2013.01); *H04L 63/10* (2013.01); *H04L 63/108* (2013.01); *H04L 2209/12* (2013.01)

(56) References Cited

OTHER PUBLICATIONS

Chaowen, Chang, et al., "A High Efficiency protocol for reporting integrity measurements," Eight International Conference on Intelligent Systems Design and Applications, Nov. 26, 2008, pp. 358-362 (Year: 2008).*

Chaowen, Chang et al., "A High Efficency protocol for reporting integrity measurements,"Eight international Conference on interligent Systems Design and Applications, Nov. 26, 2008, pp. 358-362 (Year: 2008).

Invitation to Pay Additional Fees And, Where Applicable, Protest Fee, from the International Searching Authority, dated Jul. 6, 2020, 13 pages, for corresponding International Patent Application No. PCT/US2020/026338.

Stumpf, Frederic, et al., "Improving the Scalability of Platform Attestation," STC '08, Fairfax, Virginia, U.S.A., Oct. 31, 2008, pp. 1-10.

Chaowen, Chang, et al., "A High Efficiency protocol for reporting integrity measurements," Eight International Conference on Intelligent Systems Design and Applications, Nov. 26, 2008, pp. 358-362.

Zhou, Zhen-Ji, et al., "DTSTM: Dynamic Tree Style Trust Measurement Model for Cloud Computing," KSII Transactions on Internet and Information Systems vol. 8, No. 1, Jan. 29, 2014, pp. 305-325.

"TCG Trusted Network Connected TNC IF-M: TLV Binding,"Specification 1.0, Revision 37, Mar. 10, 2010, 48 pages.

* cited by examiner

700

RECEIVE, AT A FIRST NODE, ONE OR MORE ACCESS CONTROL MESSAGES FROM A SECOND NODE, THE FIRST NODE AND THE SECOND NODE INCLUDING NETWORK DEVICES CONFIGURED TO COMMUNICATE IN A NETWORK
702

OBTAIN, BY THE FIRST NODE, ATTESTATION INFORMATION FROM ONE OR MORE FIELDS OF THE ONE OR MORE ACCESS CONTROL MESSAGES
704

DETERMINE, BY THE FIRST NODE, WHETHER THE SECOND NODE IS AUTHENTIC AND TRUSTWORTHY BASED ON THE ATTESTATION INFORMATION
706

FIG. 7

AUTHENTICATION OF NETWORK DEVICES USING ACCESS CONTROL PROTOCOLS

CROSS-REFERENCES TO RELATED APPLICATIONS

This application is a continuation of U.S. application Ser. No. 16/784,025, filed on Feb. 6, 2020, which claims the benefit of priority under U.S.C. § 119(e) to U.S. Provisional Application No. 62/830,036, filed Apr. 5, 2019, which is hereby incorporated by reference, in its entirety and for all purposes.

TECHNICAL FIELD

The present disclosure generally relates to the field of computer networking, and more particularly to assessing reliability and trustworthiness of devices operating within a network.

BACKGROUND

Trustworthiness of a given device operating within a network may degrade from the time of its initial configuration. Active measurements may be needed to validate that a device is equivalently trustworthy to the time of its initial deployment. New technologies are adding capabilities which support the secure, real-time reporting of active trustworthiness measurements or evaluation from a remote device. Specifically, all-in-one chips have been used to implement secure boot modules, trust anchor modules, and secure Joint Test Action Group (JTAG) solutions for verifying the trustworthiness of devices. Further, tokens or metadata elements containing security measurements or security evidence have been developed for verifying the trustworthiness of devices.

Based on the results from such technologies, additional analysis and remediation methods can be invoked to reduce/mitigate the effects of attacks. For example, an Integrity Verification application based on a controller can invoke the validating specific portions of device memory. When errors are found during such a check, it allows the Integrity Verification application to implement steps in order for a device to be returned to a good state.

Such memory verification checks are expensive however and such checks by themselves imply that a device is more likely to be in a good state soon after device validation, and less likely to be in a good state just before a device validation. The result of this implication is that it should be possible to use historical and operational data to quantify and graph the likelihood of compromise for a specific device since the last device validation.

Different systems and protocols are used for data collection and access control of network devices. For example, various protocols can be provided for carrying Authentication, Authorization, and Accounting (AAA or Triple A) information between a server, such as a Network Access Server (NAS), that wishes to authenticate connections to end users. The end users or clients can connect to the NAS and also wish to authenticate the NAS before allowing access or sharing data with the NAS. For communications between the server and the client using existing protocols, trustworthiness is an important factor. There is a need for systems and techniques which can be used for ensuring the trustworthiness of the client and the server.

BRIEF DESCRIPTION OF THE FIGURES

To provide a more complete understanding of the present disclosure and features and advantages thereof, reference is made to the following description, taken in conjunction with the accompanying drawings, in which:

FIG. 7 is a flow-chart of an example process for attestation of access control messages, in accordance with some implementations;

DETAILED DESCRIPTION

Figure 1:
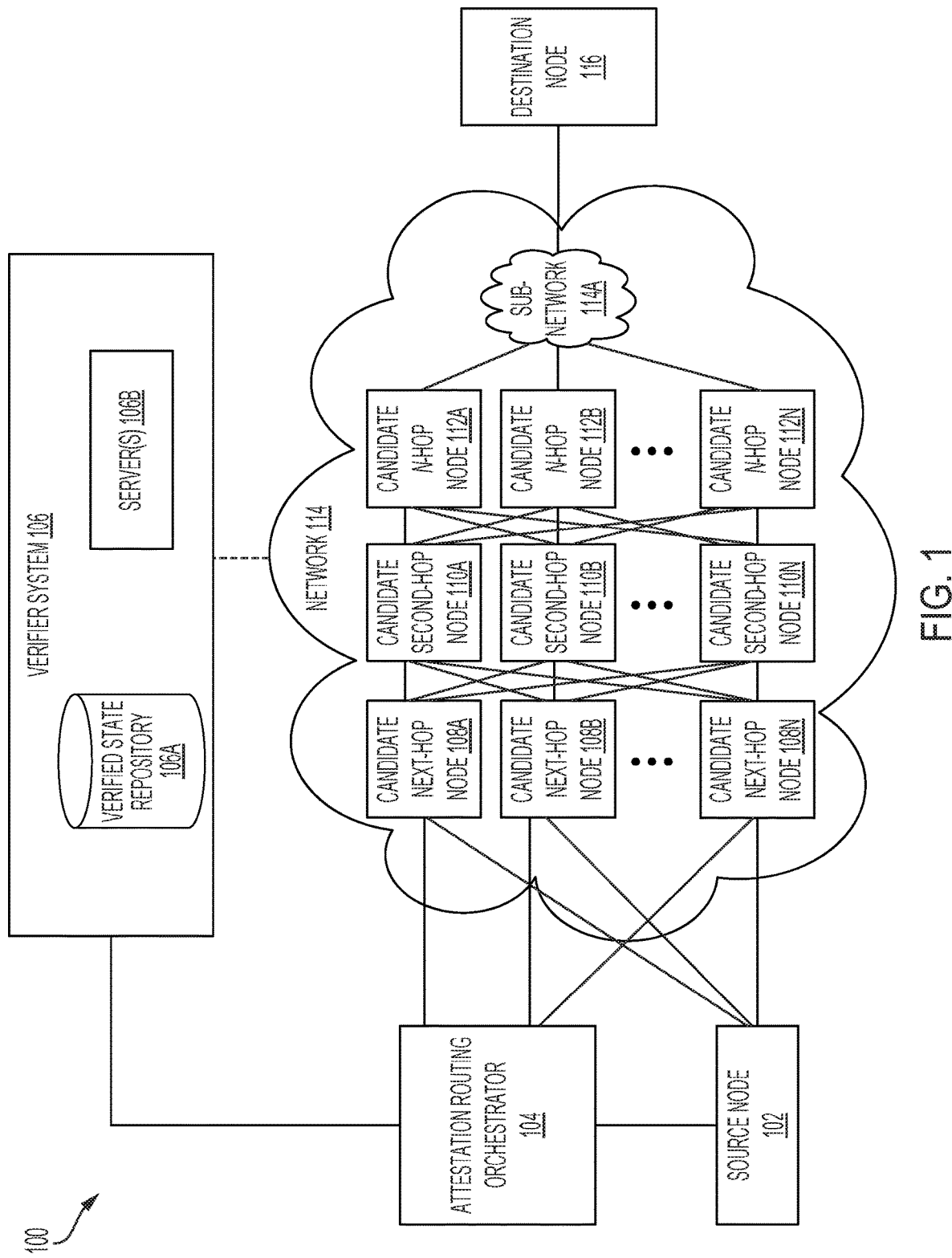
FIG. 1 is a block diagram of an example of a networking environment in accordance with some implementations.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed herein are systems, methods and computer-readable storage media for establishing trustworthiness between two network nodes, such as a server and a client. Various protocols can be used for providing for management solutions for users who connect and use a network service. A Remote Authentication Dial-In User Service (RADIUS) is a networking protocol that provides centralized AAA management for users who connect and use a network service. The RADIUS protocol may be used for authentication in access networks, including Wifi as well as wire-line access.

Terminal Access Controller Access Control System Plus (TACACS+) is a Cisco-proprietary AAA protocol. In some examples, TACACS+ can provide an alternative to the RADIUS protocol. TACACS+ can allow command authorization and accounting, and run on the top of a transport control protocol (TCP), where full packets are encrypted (rather than encryption being provided only to a password section).

For communications using the RADIUS or TACACS+ or other access control protocol, it is important for a respective server to be trustworthy and that the integrity of the server can be ensured. Likewise, it is important for the server to know whether a connecting client is trustworthy or not.

Example aspects of this disclosure include systems and methods for extending one or more messages used for communication between a first node with a second node to include one or more of proof of integrity or intent to validate proof of integrity. Trustworthiness of the second node is established based on the extensions to the one or more messages. For example, in the case of the communication being based on a RADIUS protocol, where the first node is a server and the second node is a client, or where the first node is a client and the second node is a server. The one or more messages may include one or more of Access-Request, Access-Accept, Access-Challenge, Status-Server, or Status-Client. The integrity information may include a hardware fingerprint or a Canary Stamp, where a Canary stamp, as described herein, can indicate or otherwise include a signed measurement associated with a device for verifying trustworthiness of the device. In various examples, the messages used in a TACACS+ or other protocol can be extended similarly to include the attestation information. In some examples, it is also possible to introduce new messages for carrying trust information between the two network nodes.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

In some examples, a method is provided. The method includes receiving, at a first node, one or more access control messages from a second node, the first node and the second node including network devices configured to communicate in a network; obtaining, by the first node, attestation information from one or more fields of the one or more access control messages; and determining, by the first node, whether the second node is authentic and trustworthy based on the attestation information.

In some examples, a system is provided. The system, comprises one or more processors; and a non-transitory computer-readable storage medium containing instructions which, when executed on the one or more processors, cause the one or more processors to perform operations including: receiving, at a first node, one or more access control messages from a second node, the first node and the second node including network devices configured to communicate in a network; obtaining, by the first node, attestation information from one or more fields of the one or more access control messages; and determining, by the first node, whether the second node is authentic and trustworthy based on the attestation information.

In some examples, a non-transitory machine-readable storage medium is provided, including instructions configured to cause a data processing apparatus to perform operations, the operations including: receiving, at a first node, one or more access control messages from a second node, the first node and the second node including network devices configured to communicate in a network; obtaining, by the first node, attestation information from one or more fields of the one or more access control messages; and determining, by the first node, whether the second node is authentic and trustworthy based on the attestation information.

Some examples of the methods, systems, and non-transitory machine-readable storage media, further comprise determining reliability or freshness of the one or more access control messages based on the attestation information.

In some examples of the methods, systems, and non-transitory machine-readable storage media, determining freshness comprises: receiving at a server, one or more responses from a set of one or more client devices, each of the one or more responses comprising a random number unpredictable by the server, the one or more client devices including at least the first node; combining a set of random numbers comprising one or more random numbers obtained from the one or more responses into a single nonce; and passing the single nonce through a crypto-processor to obtain a signed result comprising at least the single nonce, wherein each of the one or more client devices are configured to receive the signed result and determine freshness of the signed result based on the single nonce.

In some examples of the methods, systems, and non-transitory machine-readable storage media, the one or more access control messages are based on a Remote Authentication Dial-In User Service (RADIUS) protocol, wherein the first node is a server and the second node is a client.

In some examples of the methods, systems, and non-transitory machine-readable storage media, the one or more access control messages are based on a Remote Authentication Dial-In User Service (RADIUS) protocol, wherein the first node is a client and the second node is a server.

In some examples of the methods, systems, and non-transitory machine-readable storage media, the one or more access control messages include one or more of Access-Request, Access-Accept, Access-Challenge, Status-Server, or Status-Client messages.

In some examples of the methods, systems, and non-transitory machine-readable storage media, the one or more access control messages are based on a Terminal Access Controller Access Control System Plus (TACACS+) protocol, wherein the first node is a server and the second node is a client.

In some examples of the methods, systems, and non-transitory machine-readable storage media, the one or more access control messages are based on a Terminal Access Controller Access Control System Plus (TACACS+), wherein the first node is a client and the second node is a server.

In some examples of the methods, systems, and non-transitory machine-readable storage media, the attestation information comprises Proof of Integrity based on one or more of a Canary stamp or a hardware fingerprint comprising Proof of Freshness of the one or more access control messages, a device identifier of the second node, or an attestation key.

In some examples of the methods, systems, and non-transitory machine-readable storage media, the one or more fields comprise one or more type-length-value (TLV) fields, extensions, or modifications to the one or more access control messages.

This overview is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

DESCRIPTION OF EXAMPLE EMBODIMENTS

The disclosure now turns to an initial discussion of example concepts and technologies for providing verifiable Proof of Integrity of network nodes traversed by packets.

A computer network can include different nodes (e.g., network devices, client devices, sensors, and any other computing devices) interconnected by communication links and segments for sending data between end nodes. Many types of networks are available, including, for example, local area networks (LANs), wide area networks (WANs), software-defined networks (SDNs), wireless networks, core networks, cloud networks, the Internet, etc. When data traffic is transmitted through one or more networks, the data traffic can traverse several nodes that route the traffic from a source node to a destination node.

While having numerous nodes can increase network connectivity and performance, it also increases security risks as each node that a packet traverses can introduce a risk of unauthorized data access and manipulation. For example, when a packet traverses a node, a security risk may be introduced which can result from the node being potentially compromised (e.g., hacked, manipulated, captured, etc.). As a result, compliance, security, and audit procedures can be implemented to verify that network users, devices, entities and their associated network traffic comply with specific business and/or security policies.

When sensitive information is transmitted through nodes in a network, such as in a battlefield, banking settings, healthcare settings, etc., it is desirable to send such traffic through uncompromised nodes to prevent access to, leakage of, or tampering with the data and sensitive information carried by that traffic. If an attacker gains access to a device via some exploit, previous protection and encryption approaches for network interfaces can be ineffective at mitigating or addressing such unauthorized access and resulting damage.

Proving that network traffic complies with specific policies can involve proving in a secure way that the traffic has traversed a well-defined set of network nodes (e.g., firewalls, switches, routers, etc.) and that such network nodes have not been modified or compromised. This can help ensure that the network nodes have performed their expected or intended actions (e.g., packet processing, security or policy compliance verification, routing, etc.) on the packet and that the packet has traversed the network nodes.

Some security approaches aim at removing any implied trust in the network used for connecting applications hosted on devices to cloud or enterprise hosted services. Moreover, some security approaches can be implemented to verify the trustworthiness (e.g., the integrity, identity, state, etc.) of the network and/or nodes traversed by packets. In some cases, certain verification checks can be implemented to validate or verify that traffic has traversed a specific set of nodes and that such nodes are trusted and uncompromised. In some examples, certain Proof-of-Transit (POT), Trusted Platform Module (TPM), attestation, or Proof of Integrity approaches can be implemented to verify or validate the trustworthiness of a node in a network.

POT can enable a network user or entity to verify whether traffic traversed a defined set of network nodes. Attestation, as further described below, can also be used to verify the integrity of a node. In some cases, the approaches herein can integrate both POT and attestation to offer a secure approach that allows network users or entities to verify that traffic has traversed a defined set of nodes and that such nodes have not been compromised.

In some cases, TPM approaches can be implemented to collect and report the identity of hardware and software components in a platform to establish trust for that platform. A TPM used in a computing system can report on the hardware and software of the system in a manner that allows verification of expected behavior associated with that system and, from such expected behavior, establishment of trust. The TPM can be a system component containing state that is separate from the host system on which the TPM reports identity and/or other information. TPMs can be implemented on physical resources (indirectly or directly) of the host system. In some examples, a TPM component can have a processor and memory such as RAM, ROM and/or flash memory. In other implementations of a TPM, a host processor can run TPM code while the processor is in a particular execution mode. Parts of system memory can be partitioned by hardware to ensure that memory used by the TPM is not accessible by the host processor unless the host processor is in the particular execution mode.

In some cases, trusted computing (TC) implementations, such as TPM, can rely on Roots of Trust. Roots of Trust can be system elements that may have an associated requirement to be trustworthy because misbehavior by such system elements may not be detectable. A set of roots can provide a minimum functionality that can sufficiently describe characteristics that affect a platform's trustworthiness. In some cases, determining if a Root of Trust is behaving properly may not be possible; however, it may be possible to determine how roots are implemented. For example, certificates can provide assurances that the root has been implemented in a way that renders it trustworthy.

To illustrate, a certificate may identify the manufacturer and evaluated assurance level (EAL) of a TPM. Such certification can provide a level of confidence in the Roots of Trust used in the TPM. Moreover, a certificate from a platform manufacturer may provide assurance that the TPM was properly installed on a system that is compliant with specific requirements so the Root of Trust provided by the platform may be trusted. Some implementations can rely on two or more Roots of Trust, such as the three Roots of Trust in a trusted platform: Root of Trust for Measurement (RTM), Root of Trust for Storage (RTS), and Root of Trust for Reporting (RTR).

The RTM can send integrity information, such as integrity measurements, to the RTS. Generally, the RTM can be a processor controlled by a Core Root of Trust for Measurement (CRTM). The CRTM is the first set of instructions executed when a new chain of trust is established. When a system is reset, the processor (e.g., an RTM) can execute the CRTM, which can then send values that indicate its identity to the RTS. Thus, in some cases, the starting point for a chain of trust can be established in this manner.

As previously noted, the TPM memory can be shielded from access by an entity other than the TPM. Since the TPM can be trusted to prevent unauthorized access to its memory, the TPM can act as an RTS. Moreover, the RTR can report on the contents of the RTS. An RTR report can be a digitally signed digest of the contents of one or more values in a TPM.

Attestation is another example trusted computing approach that can be used to verify the integrity of a node. Attestation can be applied to a node, such as a router or switch, to review logs from connected devices, such as Layer 1 (L1) or Layer (L2) connected devices and maintain these logs in trusted storage. These logs can be protected by embedding a private key into every trust anchor produced for a hardware device and publishing the device's public key as a certificate to peer devices. A peer device can then push log updates from trusted storage periodically and/or on some log entry event. Reviewing any provided signed logs can provide an understanding of the current trustable state of a peer device. Moreover, by looking back at the set of transactions which have occurred since boot time, a determination can be made regarding the trustworthiness of the information which that peer device is asserting.

In some examples, metadata elements containing security measurements or evidence can be used to provide verifiable evidence of device trustworthiness (e.g., integrity, state, etc.). The metadata elements can include applicable data for verifying trustworthiness of a device and be provided through an applicable technique for verifying device trustworthiness. For example, the metadata elements can be provided as part of a canary stamp associated with the device. A canary stamp can indicate or otherwise include a signed measurement associated with a device for verifying trustworthiness of the device. In turn, such measurements can be referred to as canary stamps because each signed measurement is like a stamp proving its authenticity, and like a canary in a coal mine that indicates an early sign of trouble. Such verifiable evidence can be appended or included in packets transmitted by nodes on a network. The metadata elements can thus be used to evaluate the trustworthiness of a node(s) and react accordingly. For example, a device or entity can review metadata elements associated with a node to determine that the node should not be trusted and adjust a network policy to mitigate possible damage.

In some implementations, dedicated cryptoprocessors, such as a processor in a TPM platform, can take measurements to attest to the trustworthiness (e.g., identity, integrity, etc.) of a node and its environment (e.g., software, hardware, operating system, running binaries, firmware, etc.). These measurements include evidence that the node is in a safe state. In some cases, these measurements can be provided through canary stamps, as previously described. Therefore, a receiver of such evidence can be configured to certify that the evidence is fresh, as the evidence can become stale thereby potentially reducing its effectiveness in reflecting the current trustworthiness of a node. For example, without ensuring freshness of such evidence, an attacker has an opening to inject previously recorded measurements and asserting what is replayed as being current.

Some approaches can detect the replaying of old evidence via a "nonce". A nonce is an arbitrary number that can be used to introduce randomness. In some instances, a nonce can be used just once in a cryptographic communication. Further, a nonce can be passed into a TPM and/or incorporated into a canary stamp/metadata. In some cases, a result provided by the TPM can include a signature based on the nonce. Since the nonce can be grounded in a transactional challenge/response interaction model, in some cases the nonce may be less effective with unidirectional communications originating from an attesting device. For example, a nonce may be less effective with an asynchronous push, multicast, or broadcast message.

However, there are numerous use cases where a platform assessing whether its peers are trustworthy is advantageous. Being able to perform a unidirectional attestation using an asynchronous push, multicast, or broadcast message in conjunction with trusted binaries opens many possibilities for platforms to assess whether their peers are trustworthy. Detection of invalid attestations can trigger alarms or events, reduction of network access from a suspect device, or can become a part of Admission Control (e.g., IEEE 802.1X). Some platforms can be configured to support the unidirectional attestation mechanism.

Other freshness approaches can be based on trusted computing capabilities, such as TPM. For example, a token can be generated which allows external entities to validate freshness of asserted data based on the state of internal counters within the TPM. This token can be used to detect replay attacks, and provide attestation for asynchronous push, multicast, and broadcast messages.

Various approaches discussed above can be combined with TPM-integrated capabilities aimed at verifying that valid compute components, such as binary processes, are running on a node. These capabilities can include, for example, Trusted Execution Environments (TEE) which provide runtime malware protections, Authenticated Code Modules (ACM) which ensure that only digitally-signed code modules can be loaded into a processor, and the like. These technologies can validate that a processor is running known software with a valid chain of binary signatures.

In some cases, metadata elements, e.g. canary stamps, and tokens can be created by extracting current counters (e.g., clock, reset, restart) from a node's TPM, and incorporating such counters and security measures taken from the node into a packet. In some examples, the current counters and/or security measures can be hashed with information within an external TPM. The metadata elements and tokens can thereby provide a non-spoofable token or metadata element, which can bind continuously incrementing counters on an attestee with a known external state. Any resetting of the TPM counters is visible in any subsequent TPM queries, and any restarting of a platform is also exposed in subsequent TPM queries. Within these bounds of reset and restart, the TPM's time ticks counter continuously increments. Therefore, any push of attestee TPM information which includes these counters can be determined to have occurred subsequent to any previously-received measurement. Also, if the reset and restart counters have not changed, the incremental time since any previous measurement can also be known.

In some cases, a large amount of information that is expected to be trusted by network peers may not be contained within the TPM's Program Configuration Registers (PCR). As a result, indirect methods of validating that a node has not been compromised can be applied.

The receipt of the metadata elements, e.g. canary stamps, and/or tokens can mean that a receiver is provided with the option of verifying the information. In many cases, such verification can be performed without the need of supplementary evidence being sent with the canary stamp. Moreover, in non-controller based or centralized implementations, the verification steps do not have to occur at the receiver.

In some integrity verification implementations, a controller or device can implement an integrity verification application. The integrity verification application can be designed to recognize change events and evaluate known good values, which allow evaluation of a boot-integrity stamp and a running process binary signature stamp based on, for example, TPM counters, timestamps, nonces, and/or time tokens. On any discrepancy, a controller or centralized device can isolate a compromised node from its network peers by shutting down the interfaces of the node.

In some examples, the metadata elements, e.g. canary stamps, and/or verifications for integrity can be implemented, such as a measured-boot stamp (e.g., SHA1 hash over PCRs 0-7), a verified-boot stamp (e.g., which can verify that only recognized binaries were executed when booting), a process-stamp (e.g., root-of-trust validated through a process which is asserting a particular protocol or protocols), a file-system stamp (e.g., all files within a vendor determined set of directories), a log-integrity stamp (e.g., used to augment existing integrity analytics and forensics), a configuration stamp (e.g., State of the current device configuration), etc. Some implementations can achieve all or some of these stamps, depending on the implementation. Moreover, in some implementations, all or some of these stamps can be implemented or achieved using a single or multiple stamps.

As previously explained, TPM provides methods for collecting and reporting the identity of hardware and software components in a platform to establish trust for that platform. TPM functionality can be embedded in a variety of devices including mobile phones, personal computers, network nodes (e.g., switches, routers, firewalls, servers, network appliances, etc.), and/or any other computing devices. Further, attestation can describe how the TPM can be used as a hardware root of trust and offer Proof of Integrity of a node. Such integrity can include hardware integrity, software integrity (e.g., micro loader, firmware, boot loader, kernel, operating system, binaries, files, etc.), and runtime integrity.

In some cases, TPM and attestation can be implemented as described herein to provide Proof of Integrity and proof of transit through uncompromised nodes. In some examples, metadata elements and tokens containing or reflecting security measures are used as previously mentioned to validate the integrity of a node and perform continuous evaluation of node integrity. Thus, the metadata elements and tokens described herein can be used to provide proof of transit through uncompromised nodes.

In some examples, the metadata elements and tokens can be added as additional metadata to packets that traverse a network where proof of transit via uncompromised nodes is desired. Various strategies can be implemented for transporting the metadata elements and tokens in a packet. In some cases, the metadata elements and tokens can be carried within an In-Situ (or in-band) Operations, Administration and Management (IOAM) data field.

In some implementations, the metadata elements and tokens can be carried with IOAM trace data. For example, a canary stamp can be carried as part of an IOAM data field in a variety of encapsulation protocols such as, for example and without limitation, IPv4, IPv6, NSH (Network Service Header), etc. In some cases, the canary stamp can be carried in an IOAM data field as an IOAM Trace option data element (e.g., with an IOAM Trace type for node integrity canary stamp). A metadata element, token, or digest, e.g. canary stamp digest, can be added in the IOAM trace option of a packet by each node that forwards the packet.

When the packet reaches a node (e.g., the destination node and/or an intermediate node) that removes IOAM metadata (e.g., an IOAM decapsulating node), the validity of the metadata element and/or token in the packet can be verified to determine that the packet traversed uncompromised nodes. In some examples, since canary stamps are time bound, the packet trace timestamps defined in IOAM can be used to validate the canary stamp in the time window the packet traversed that node.

Verification can be performed without placing a large transactional load on the verifier or a device, such as a controller, that will ultimately validate the security measurements associated with the metadata elements or tokens. This is because the measurement values can often change infrequently. It may be sufficient for the verifier to validate a metadata element and/or token carried within an IOAM data trace whenever the associated security measurements associated change (e.g., a verifier may only need to check with a controller whenever it sees a node's TPM extends a PCR value which was not previously confirmed by the verifier).

In some cases, when only the time ticks within a signed metadata element increases, only the signature of the metadata element is validated. To do this, the verifier may use the public key of any node which can place a metadata element. Such signature validation can be done without using a controller to verify the measurements.

In another example, a packet can carry IOAM POT data with space optimization of metadata element values, e.g. canary stamp values. For example, a new IOAM POT data field can carry a canary stamp or a hash extension of a canary stamp and, in turn, canary stamp data can be carried across nodes. In some cases, a canary stamp hash extend can be a similar method as PCR extend operation performed by TPMs.

In some cases, the canary stamp hash can provide a one-way hash so that a canary stamp recorded by any node cannot be removed or modified without detection. IOAM proof of transit option data for a canary stamp digest can be defined by a hash algorithm (e.g., 20 octets with SHA1, 32 octets with SHA 256, etc.). In some implementations, each node along a path of the packet can forward the packet with a new or updated canary stamp digest. In some examples, the new or updated canary stamp digest can be generated by a node as follows: IOAM canary stamp digest new value=Digest of (IOAM canary stamp digest old value||hash (canary stamp of the node)), where the IOAM canary stamp digest old value can refer to the canary stamp digest included in the packet by one or more previous hops.

Moreover, in some cases, a Per Packet Nonce (PPN), where PPN changes per packet and is carried as another field within the IOAM metadata option, can be added to provide robustness against replay attacks. To illustrate, in some examples, a PPN can be added as follows: IOAM canary stamp digest new value=Digest of (IOAM canary stamp digest old value||hash (canary stamp of the node||PPN)). A node creating the new value for the IOAM canary stamp digest can thus take the value of any previous IOAM canary stamp digest and extend/hash that value with the node's current canary stamp. The result of the concatenation and hashing can then be written into IOAM POT data (or other IOAM data fields) as the new IOAM canary stamp digest.

At the verifier (e.g., the device verifying the canary stamp data), the same operation can be performed over expected canary stamp values calculated for the nodes that are traversed in the time window when the packet was forwarded. A verifier can be an inline device or a centralized device. Moreover, in some examples, nodes that are expected to be traversed can be identified using IOAM tracing, routing state or by sending active probes. A match between the value of POT data carrying specific metadata elements, e.g. a canary stamp digest and the expected canary stamp value, can prove that the packet traversed through trusted or uncompromised nodes.

In some examples, one or more strategies can be implemented to optimize metadata element validation. For example, metadata elements, e.g. canary stamps, can detect attempts of a replay attack by embedding a nonce as well as TPM or TPM2 counters (e.g., clock, reset, restart). In some cases, this nonce can be part of the metadata elements and different from the PPN described above.

The nonce is relevant to a receiver as the interval from the nonce's creation time to the first stamp received by the verifier can define the interval of freshness (e.g., the measurement is no older than this interval of freshness). From there, the TPM2 time ticks counter can be used to maintain that initial gap of freshness even without the delivery of a new nonce.

In some implementations, to optimize metadata element or token validation across nodes, the following approaches can be implemented to deliver synchronization information from a central component to each node and the verifier. For example, a central server can broadcast or multicast centralized nonce values (e.g., tracked random numbers). Each node can pick up the latest nonce and use it to attest a value. A verifier can know the freshness of a metadata element or token it receives from each node. This freshness can be the delta in time since that particular nonce was issued. Subsequent attestations can use the incrementing time ticks to prove freshness from that initial time gap. In some cases, the issuing of new nonces can reset the time gap to a potentially shorter interval.

Moreover, in some cases, each node can embed attested time within its metadata element. To get attested time, a TUDA (Time-Based Uni-Directional Attestation) scheme such as the TUDA scheme described in https://tools.ietf.org/id/draft-birkholz-i2nsf-tuda-01.html, the contents of which are incorporated herein by reference in their entirety, can be used. This can result in the availability of both the attested time at a node, as well as the value of the TPM2 counters at this node when a TUDA time-synchronization token was created. This can eliminate the use of a central nonce authority, but can increase the size of the metadata element as the nonce can be replaced by the TUDA time-synchronization token. This approach may also implement a central timestamp authority as per TUDA. In some examples, for each hop, a canary stamp digest value can be: IOAM canary stamp digest new value=Digest of (IOAM canary stamp digest old value||hash (canary stamp of the node||TUDA time-synchronization token of the node)).

This approach can provide numerous benefits. For example and without limitation, with this approach, a verifier can limit the number of verifications by verifying the signature of a hop's time-synchronization token only when it changes. Moreover, with this approach, there may not be a time gap nonce changeover freshness when a first measurement is received. Further, in some cases, this approach can be implemented without also carrying a PPN or without synchronizing a nonce across nodes as previously described.

Further, an attestor, e.g. a node or a verifier, can use random numbers, otherwise pseudo-random numbers, created by peers and/or the attestor to generate and verify attestation information. Specifically, the attestor can accumulate random numbers from one or more layer 2 peers. The random numbers can be accumulated from the peers over a specific amount of time, e.g. a short duration of time. In turn, the random numbers can be combined into a number through an applicable technique, e.g. a Bloom filter. This number can serve as a nonce for a cryptoprocessor for generating a result. As follows, the layer 2 peers, potentially including the attestor, can use the result created by the cryptoprocessor, to verify/validate that their corresponding provided random number was used in generating the nonce ultimately used by the cryptoprocessor to create the result. In turn, the layer 2 peers, potentially including the attestor, can generate verified attestation information based on the random numbers generated by the peers, the nonce created from the random numbers, and/or the result created by the cryptoprocessor from the nonce.

In some examples, attestation of peers may be important for communication protocols employed between a client and a server in a computer network. For example, the RADIUS or TACACS+ protocol can provides centralized AAA services for users who connect and use a network service. The RADIUS protocol may be used for authentication in access networks, including Wifi as well as wire line access. For communications using the RADIUS protocol, it is important for the RADIUS server to be trustworthy and that the integrity of the RADIUS server can be ensured. Likewise, it is important for the RADIUS server to know whether a connecting client, e.g. an Authenticator in a 802.1x setup, is trustworthy or not.

The present RADIUS standards (e.g., RFC 2865) do not include any capabilities to exchange trust information between two peers such as a RADIUS client and the RADIUS server. For example, the existing systems do not provide the capability for either the client or the server to prove to one another that they are trustworthy and/or were not tampered with.

The approaches herein can provide trustworthiness for communications between two nodes such as a server and a client (e.g., RADIUS, TACACS+, etc.) In some examples, the approaches herein may be used to provide attestation techniques in the communications using RADIUS protocols. For example, before a RADIUS client fully connects to a RADIUS server, the RADIUS client may verify that the RADIUS server is trustworthy and/or has not been compromised. Similarly, the approaches herein may also be used by the RADIUS server to ensure that a RADIUS client that the RADIUS server connects to is a trusted client which has not been compromised.

The present technologies will be described in more detail in the following disclosure as follows. The discussion begins with an introductory description of systems and technologies for providing explicit verifiable proof of integrity of network nodes traversed by packets. A description of example systems, methods and environments for attestation using extensions or modifications to messages in access control protocols such as a RADIUS protocol, TACACS+, or other protocol for providing explicit verifiable proof of integrity of nodes will then follow. The discussion concludes with a description of an example network and computing devices for implementing aspects of this disclosure.

Having provided an initial discussion of example concepts and technologies for providing explicit verifiable Proof of Integrity of network nodes traversed by packets, the disclosure now turns to FIG. 1.

FIG. 1 is a block diagram of an example of networking environment 100 in accordance with some implementations. While pertinent features are shown, those of ordinary skill in the art will appreciate from the present disclosure that various other features have not been illustrated for the sake of brevity and so as not to obscure aspects of the example implementations disclosed herein.

In this example, the networking environment 100 can include a network 114 of interconnected nodes (e.g., 108A-N, 110A-N, and 112A-N). The network 114 can include a private network, such as a local area network (LAN), and/or a public network, such as a cloud network, a core network, and the like. In some implementations, the network 114 can also include one or more sub-networks, such as sub-network 114A. Sub-network 114A can include, for example and without limitation, a LAN, a virtual local area network (VLAN), a datacenter, a cloud network, a wide area network (WAN), etc. In some examples, the sub-network 114A can include a WAN, such as the Internet. In other examples, the sub-network 114A can include a combination of nodes included within a LAN, VLAN, and/or WAN.

The networking environment 100 can include a source node 102. The source node 102 can be a networking device (e.g., switch, router, gateway, endpoint, etc.) associated with a data packet that is destined for a destination node 116. The source node 102 can communicate with candidate next-hop nodes 108A-108N on the network 114. Each of the candidate next-hop nodes 108A-108N can be included within a respective route between the source node 102 and the destination node 116. Moreover, in some cases, each of the candidate next-hop nodes 108A-108N can communicate with candidate second hop nodes 110A-110N in the network 114. Each of the candidate second hop nodes 110A-110N can similarly communicate with candidate N-hop nodes 112A-112N in the network 114.

The networking environment 100 can also include an attestation routing orchestrator 104. The attestation routing orchestrator 104 can communicate with the candidate next-hop nodes 108A-108N. In some implementations, the attestation routing orchestrator 104 can obtain attestation data (e.g., canary stamps, security measures, signatures, and/or metadata) or vectors from the candidate next-hop nodes 108A-108N. In some examples, the attestation routing orchestrator 104 can obtain additional information from candidate second-hop nodes 110A-110N and/or candidate N-hop nodes 112A-112N and utilize the additional information in selecting a particular candidate next-hop node for a packet. In some implementations, the attestation routing orchestrator 104 can also obtain additional information from nodes that are more than two hops away (e.g., candidate third hop nodes, candidate fourth hop nodes, etc.).

The attestation routing orchestrator 104 can communicate with a verifier system 106. While, the verifier system 106 is conceptually shown as being implemented separate from the network 114, the verifier system 106 can be implemented within the network 114, e.g. as part of a network device in the network 114. In some implementations, the attestation routing orchestrator 104 can obtain trusted state, such as a trusted image vector, from the verifier system 106. The verifier system 106 can include a verified state repository 106A and one or more servers 106B. In some examples, the verified state in the verified state repository 106A can include one or more verified images, verified security measurements, verified settings, verified node data, and/or any other verified trust or integrity data. In some implementations, the verified state in the verified state repository 106A can include one or more trusted states or image vectors that are known with a degree of confidence to represent uncompromised states or images (e.g., states or images that have not been hacked, attacked, improperly accessed, etc.).

As will be described in great detail with reference to FIG. 4, in some cases, the attestation routing orchestrator 104 can select and direct a data packet to a particular candidate next-hop node of the candidate next-hop nodes 108A-108N based on a trusted state or image vector and the attestation states or vectors. Moreover, the attestation routing orchestrator 104 can direct the data packet destined for the destination node 116 to the particular candidate next-hop node.

Figure 2:
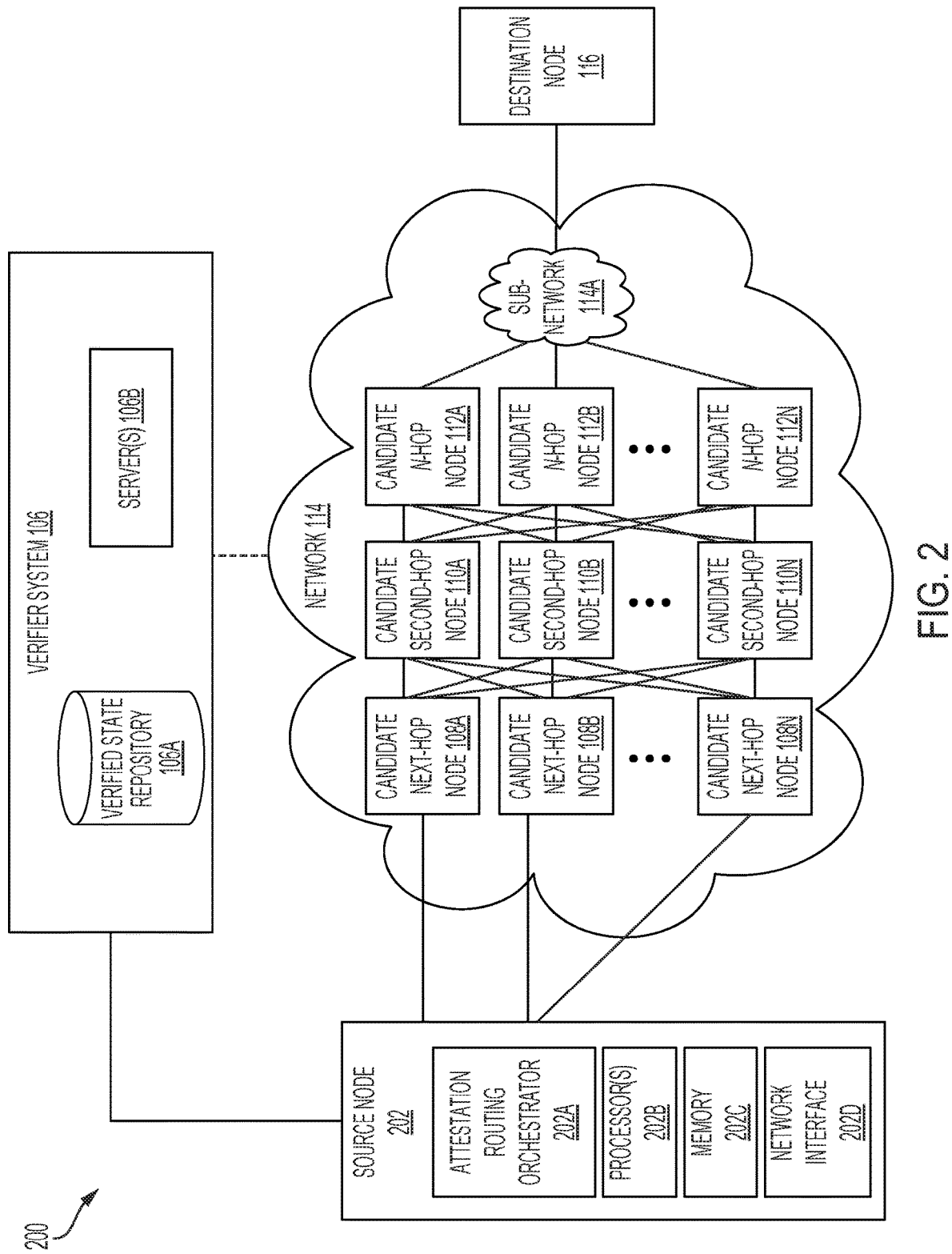
FIG. 2 is a block diagram of an example of a networking environment in accordance with some implementations.

FIG. 2 is a block diagram of another example networking environment 200 in accordance with some implementations. In this example, the networking environment 200 includes a source node 202 that implements an attestation routing orchestrator 202A. In some implementations, the attestation routing orchestrator 202A can be similar to, or adapted from, the attestation routing orchestrator 104 in FIG. 1.

The source node 202 can include one or more processors 202B. In some implementations, the one or more processors 202B can provide processing resources for generating a confidence scores for the candidate next-hop nodes 108A-108N. In some implementations, the one or more processors 202B can provide processing resources for selecting a particular confidence score, from the confidence scores, that satisfies one or more selection criteria.

In some examples, the source node 202 can include a memory 202C. The memory 202C can be, for example and without limitation, a non-transitory memory, such as RAM (random-access memory), ROM (Read-only memory), etc. The memory 202C can store the data, such as the packet destined for the destination node 116. In some implementations, the memory 202C can store a trusted state or image vector obtained from the verifier system 106. In some implementations, the memory 202C can store attestation states or vectors obtained from the candidate next-hop nodes 108A-108N and optionally attestation states or vectors obtained from the candidate second hop nodes 110A-110N and/or the candidate N-hop nodes 112A-112N. The source node 202 can also include a network interface 202D for obtaining, receiving, and transmitting the data packets and states or vectors.

In some implementations, the source node 202 can select and direct a data packet to a particular candidate next-hop node based a trusted state or image vector and the attestation states or vectors.

Figure 3:
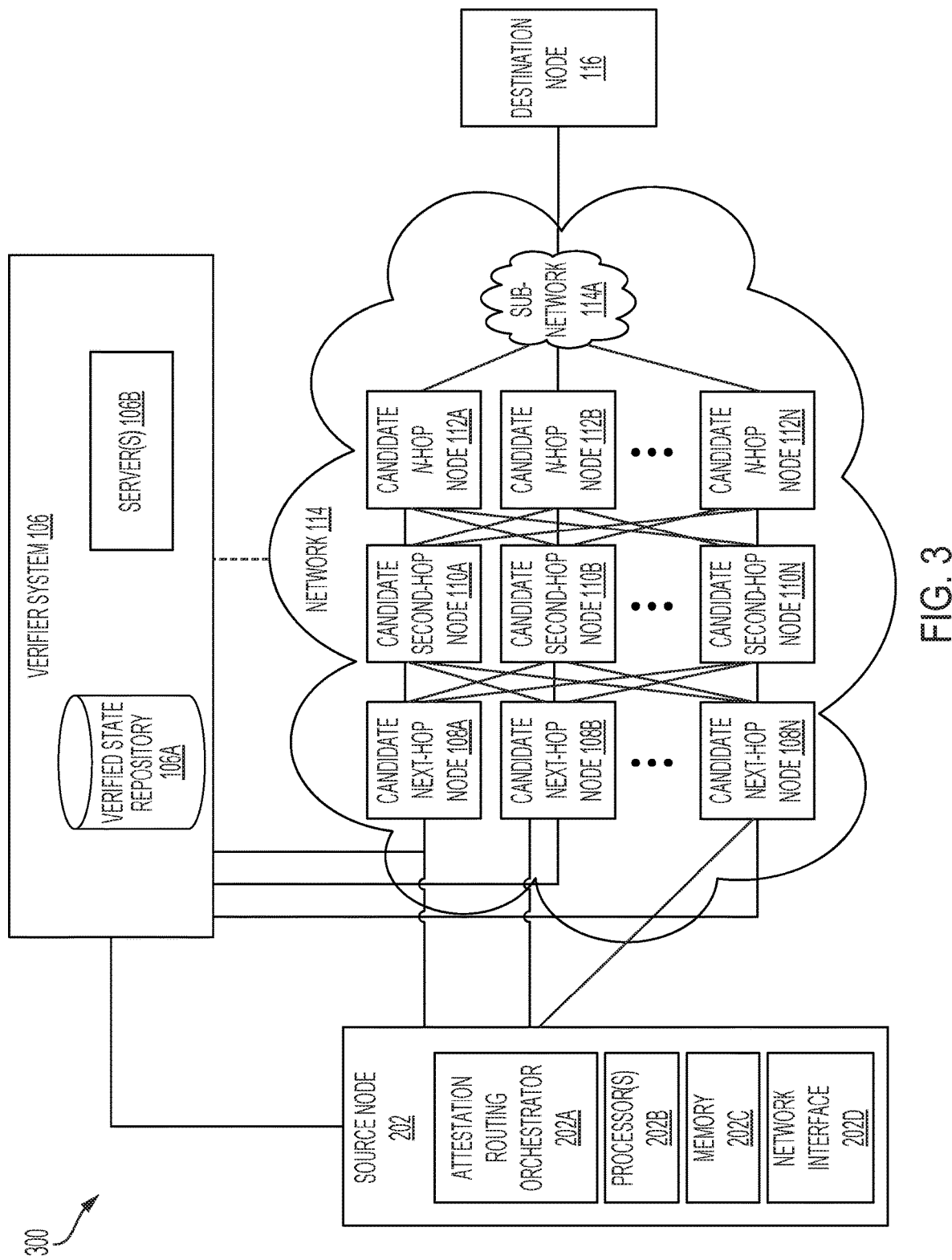
FIG. 3 is a block diagram of an example of a networking environment in accordance with some implementations.

FIG. 3 is a block diagram of another example networking environment 300 in accordance with some implementations. In this example, one or more of the candidate next-hop nodes 108A-108N can relay a trusted state or image vector from the verifier system 106 to the source node 302. In some implementations, the attestation routing orchestrator 302A can be similar to, or adapted from, the attestation routing orchestrator 104 in FIG. 1 and/or the attestation routing orchestrator 202A in FIG. 2.

In some implementations, the verifier system 106 can sign the trusted state or image vector and provide the signed trusted state or image vector to a particular candidate next hop node, which in turn can provide the signed trusted state or image vector to the source node 302. In some implementations, having the particular candidate next hop node provide the signed trusted state or image vector can reduce attestation time (e.g., the time to determine trustworthiness of the particular candidate next hop node) because the source node 302 may not need to contact a remote node (verifier system 106). In some implementations, attestation time can be further reduced because a single attestation process (e.g., the verifier system 106 signing the trusted state or image vector) facilitates the attesting of multiple source nodes. In other words, trusted states or image vectors may not be generated and evaluated on a per source node basis.

Moreover, in implementations in which the source node 302 is not connected to the verifier system 106 (e.g., link down), obtaining the trusted state or image vector from the particular candidate next hop provides an alternative mechanism for node attestation. In some implementations, the verifier system 106 appends a time-stamped response to the trusted state or image vector as part of the signing process, which can be referred to as stapling. Consequently, the source node 302 may not contact the verifier system 106 in order to attest a particular candidate next hop node.

Figure 4:
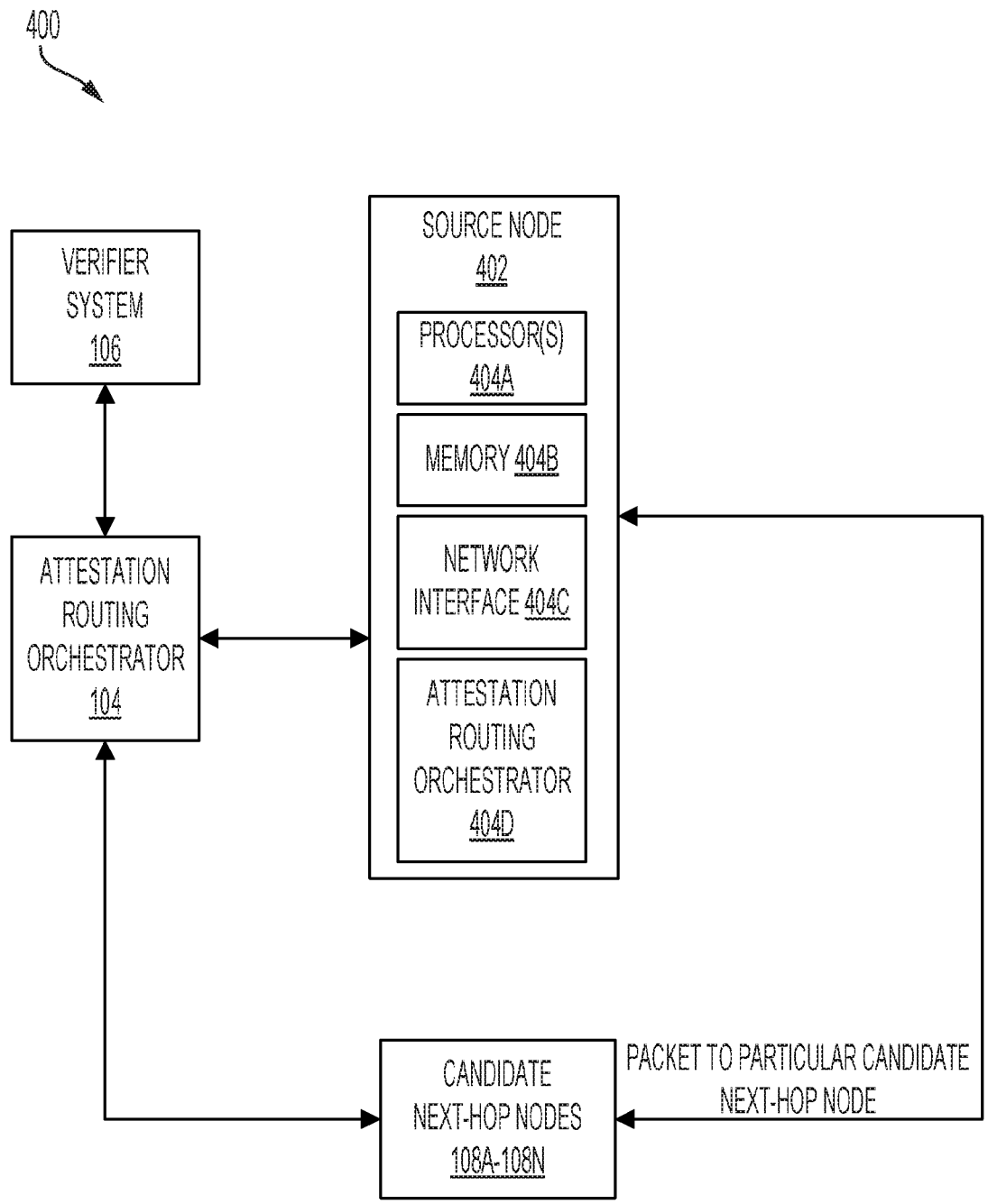
FIG. 4 is a block diagram of controller orchestrated attestation based routing in accordance with some implementations.

FIG. 4 is a block diagram of an example controller-orchestrated attestation-based routing 400, in accordance with some implementations. In some examples, the source node 402 is similar to, or adapted from, the source node 102 in FIG. 1. As illustrated in FIG. 4, the attestation routing orchestrator 104 is separate from, but coupled (e.g., connected) to, the source node 402. In some examples, the attestation routing orchestrator 104 can include a controller with knowledge of the network 114 that includes the candidate next-hop nodes 108A-N and optionally the candidate second-hop nodes 110A-N and/or the candidate N-hop nodes 112A-N.

For example, in some implementations, the attestation routing orchestrator 104 can be a network management system (NMS). As another example, in some implementations, the attestation routing orchestrator 104 can be an intent-based networking system, such as Cisco's Digital Network Architecture (DNA). As yet another example, in some implementations, the attestation routing orchestrator 104 can be a wireless LAN controller (WLC), and the candidate next-hop nodes 108A-108N and optionally the candidate second hop nodes 110A-N and/or the candidate N-hop nodes 112A-N can be networking devices such as access points, user devices, switches, routers, firewalls, etc.

The attestation routing orchestrator 104 can obtain attestation data (e.g., canary stamps) from the candidate next-hop nodes 108A-108N. Each of the candidate next-hop nodes 108A-108N can be included within a respective route between the source node 402 and a destination node (e.g., 114). In some implementations, the respective routes are independent of each other.

The attestation routing orchestrator 104 can determine confidence scores based on the attestation data. For example, in some cases, each of the confidence scores can be based on a comparison between a corresponding one of the attestation data and a trusted state or image vector. In some implementations, the attestation routing orchestrator 104 can obtain the trusted state or image vector from the verifier system 106.

In some examples, the attestation routing orchestrator 104 can obtain attestation data from candidate second-hop nodes (e.g., 110A-N) and/or candidate N-hop nodes (112A-N). Each of the candidate second-hop nodes and/or the candidate N-hop nodes can be included within a respective route between a corresponding one of the candidate next-hop nodes 108A-108N and the destination node. Moreover, each of the confidence scores can additionally be based on a comparison between a corresponding one of the attention data and the trusted state or image vector in combination with a comparison between another corresponding one of the attestation data from the candidate next-hop nodes 108A-N and the trusted state or image vector.

The attestation routing orchestrator 104 can select, from the confidence scores, a particular confidence score that satisfies one or more selection criteria. The particular confidence score is associated with a particular candidate next-hop node of the candidate next-hop nodes 108A-108N.

The attestation routing orchestrator 104 can direct, to the particular candidate next-hop node, a data packet destined for the destination node. For example, in some cases, the attestation routing orchestrator 104 can provide attested route information (e.g., validated canary stamp data, security measurements, etc.) to an attested route manager 402D of the source node 402 in order to facilitate the source node 402 sending the data packet to the particular candidate next-hop node. The attested route information can be indicative of the trustworthiness of each of the candidate next-hop nodes 108A-108N.

For example, in some implementations, the attested route information includes an identifier (e.g., an IP address, a MAC address, an SSID, etc.) identifying a secure candidate next-hop node of the candidate next-hop nodes 108A-108N. In this example, the source node 402 can provide the data packet based on the identifier in order to route the data packet to the secure, particular candidate next-hop node.

As another example, in some implementations, the attested route information can include confidence scores associated with the candidate next-hop nodes 108A-108N. In this example, the attested route manager 402D can select a particular candidate score based on one or more selection criteria. Moreover, the attested route manager 402D can provide the data packet to the particular next-hop node associated with the particular candidate score. In some examples, the attestation routing orchestrator 104 can cease to direct additional data packets to the particular candidate next-hop node in response to determining that the particular confidence score falls below a confidence threshold.

In some cases, the source node 402 can include one or more processors 402A. The one or more processors 402A can provide processing resources for managing attested route information obtained from the attestation routing orchestrator 104. The source node 402 can also include a memory 402B. The memory 402B can include, for example, a non-transitory memory such as RAM, ROM, etc. In some examples, the memory 402B can store data such as the obtained attested route information and data packets to be transmitted. The source node 402 can also include a network interface 402C for obtaining the attested route information and sending/receiving other data.

In some cases, whether a network device has been compromised can be determined based on indicators associated with the network device and time information. The indicators can include, but are not limited to, a set of security measurements or evidence footprints which indicate whether a particular device is compromised. Such indicators can come from one or more sources such as, for example and without limitation, TPM, canary stamps, Syslog, YANG Push, EEM, peer devices, traffic counters, and other sources. Visibility can be a method of identifying a compromise in a timely manner.

According to some aspects, access control protocols enhanced with attestation based Proof of Integrity are disclosed. In some examples, a source node 102, one or more servers 106B, or other nodes can include a server node of a network. In some examples, one or more of the candidate next-hop nodes 108A-N, 110A-N, 112A-N, or a destination node 116 can include a client node of the network. In various examples, access control between the server node and the client node can be based on a RADIUS, TACACS+, or other protocol. However, since the identity authentication of the server or the client itself using the existing AAA services may not be sufficient because the server node or the client node (or both) could have been compromised, the disclosed techniques include attestation methods for Proof of Integrity for the nodes.

The description herein includes references to some well-known time access control protocols to provide illustrative examples of attestation based enhancements to these protocols. However, it will be understood that the example attestation techniques discussed herein can be extended to any access control scheme or protocol without limitation.

Figure 5:
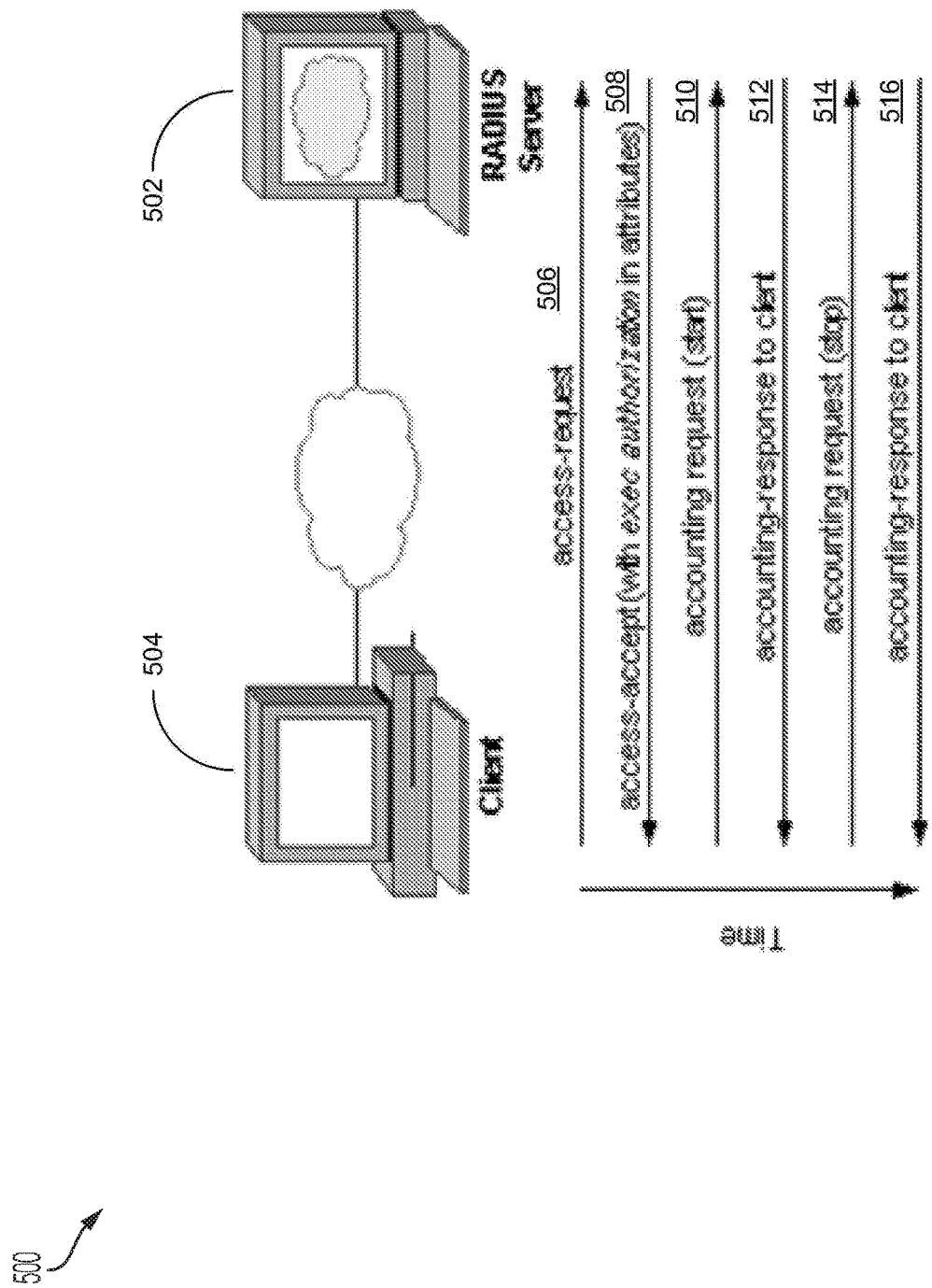
FIG. 5 illustrates an example system for determining a device trustworthiness using a Remote Authentication Dial-In User Service (RADIUS) protocol.

FIG. 5 is a schematic diagram of a system 500 which is configured to utilize a RADIUS protocol. A RADIUS server 502 and a client 504 are shown in the system 500. The RADIUS server 502 can include an access server that uses AAA protocol. The system 500 can include distributed security measures for securing remote access to networks and network services against unauthorized access. RADIUS protocols can include a frame format that utilizes User Datagram Protocol (UDP)/IP.

In some examples, the RADIUS server 502 can be configured on a central computer (typically at the customer's site), while one or more clients such as the client 504 can reside in sites served by dial-up access, which may be distributed throughout the network. The client 504 can be configured to pass user information to a designated RADIUS server such as the RADIUS server 502, and then act on a response that is returned. The RADIUS server 502 can be configured to receive user connection requests from the client 504 and authenticate the user. The RADIUS server 502 can also return configuration information necessary for the client 504 to deliver service to the user. In some examples, the RADIUS server 502 can act as a proxy client to other kinds of authentication servers.

To ensure network security, transactions between the client 504 and the RADIUS server 502 can be authenticated through the use of a shared secret, which is not shared over the network. In addition, any user passwords can be sent encrypted between the client 504 and the RADIUS server 502 to protect against snooping attacks on an unsecured network.

In some examples, the RADIUS protocol allows flexible authentication mechanisms for the RADIUS server 502 to authenticate a user or client 504. When it is provided with the user name and original password given by the user, the RADIUS protocol can support PPP, Password Authentication Protocol (PAP), or Challenge Handshake Authentication Protocol (CHAP), UNIX login, and other authentication mechanisms.

If the RADIUS server returns no response to the RADIUS client within a defined timeout, the request is resent a number of times. The RADIUS client can also forward requests to an alternate RADIUS server or servers in case the primary server is down or unreachable.

In an illustrative example of traffic between the client and server for the RADIUS protocol used for router management is shown in FIG. 5. This example assumes login authentication, exec authorization, and start-stop exec accounting is implemented with RADIUS when a user Telnets to a router, performs a command, and exits the router.

For example, an access-request 506 is sent from the client 504 to initiate an access request from the RADIUS server 502. When accepted, an access-accept 508 is returned from the RADIUS server 502 to the client 504. The accounting features of the RADIUS protocol can be used independently of RADIUS authentication or authorization. The NAS, which provides a service to the dial-in user (such as PPP or Telnet) can be responsible for passing user accounting information to a designated RADIUS accounting server. At the start of service delivery, the NAS generates an Accounting Start packet 510 describing the type of service being delivered and the user accessing the service. The client 504 sends a request with the Accounting Start packet 510 to the RADIUS server 502. The RADIUS server 502 returns an acknowledgment, Accounting-Response 512 to the NAS, acknowledging that the Accounting Start packet 510 has been received. At the end of the service delivery, the client 504 generates an Accounting Stop packet 514, describing the type of service that was delivered and session statistics such as elapsed time, input and output octets, and input and output packets. The RADIUS server 502 responds with an Accounting Response 516. In general, the traffic can include any other set of messages such as in the illustrative example shown above, including the following example set of messages: Access-Request; Access-Accept; Access-Challenge; Status-Server; Status-Client.

In some examples, the above-described messages exchanges or packets between the client 504 and the RADIUS server 502 can be enhanced or new messages can be introduced to include attestation or Proof of Integrity. For example, the messages exchanged between a RADIUS server 502 and a RADIUS client 504 according to a RADIUS protocol may be extended to carry Proof of Integrity and/or intent to validate proof of integrity. For example, the Proof of Integrity may include one or more of the visible indicators to determine whether a network device (e.g., the RADIUS server 502 and/or the RADIUS client 504) has been compromised.

In some examples, the Proof of Integrity which may be introduced in one or more of the messages 506-516 (or others), for example, may include one or more of a Canary stamp, a hardware signature or finger print. In some examples, the Proof of Integrity may include software, such as a micro loader, Basic Input Output System (BIOS), boot loader, kernel, or operating system. In some examples, the Proof of Integrity may include runtime signatures such as application binaries, libraries and configuration or manifestation files. In some examples, the Proof of Integrity can additionally or alternatively include a signature using a private key such as a device key, a device identifier such as a Secure Unique Device Identification (SUDI) of the device or an attestation key.

In some examples, the Proof of Integrity may also be accompanied with a signature to prove freshness of the Proof of Integrity, e.g. by adding a signature over a random data/nonce presented by a peer. In example aspects, attestation information may be added to the RADIUS messages (e.g., 506-516) as an extension that embeds a hardware fingerprint (e.g., derived from the device ID or similar), and/or a Canary stamp. The RADIUS server 502 and/or the client 504 can use this information to verify whether the corresponding peer is trustworthy. In general, the attestation information can be used by a first node to verify integrity and authenticity of a second node (where in some examples, the first node can be the RADIUS server 502 and second node can be the client 504, while in some examples, the first node can be the client 504 and second node can be the RADIUS server 502).

In some examples, the Proof of Integrity information may be added using a new set of type-length-values (TLVs) to the RADIUS messages (e.g., 506-516 or more generally, Access-Request; Access-Accept; Access-Challenge; Status-Server; and/or Status-Client messages between a RADIUS server and client). For example, the TLVs can include a Canary stamp, which would contain Platform Config Registers (PCR), timeticks, or other signature. In some examples, a RADIUS Client Access-Request can contain a random data nonce, which is extended to carry intention to validate Proof of Integrity. The RADIUS Server Access-Response can carry an extension of its Proof of Integrity along with a signature over random data received in the RADIUS Client Access-Request.

Figure 6:
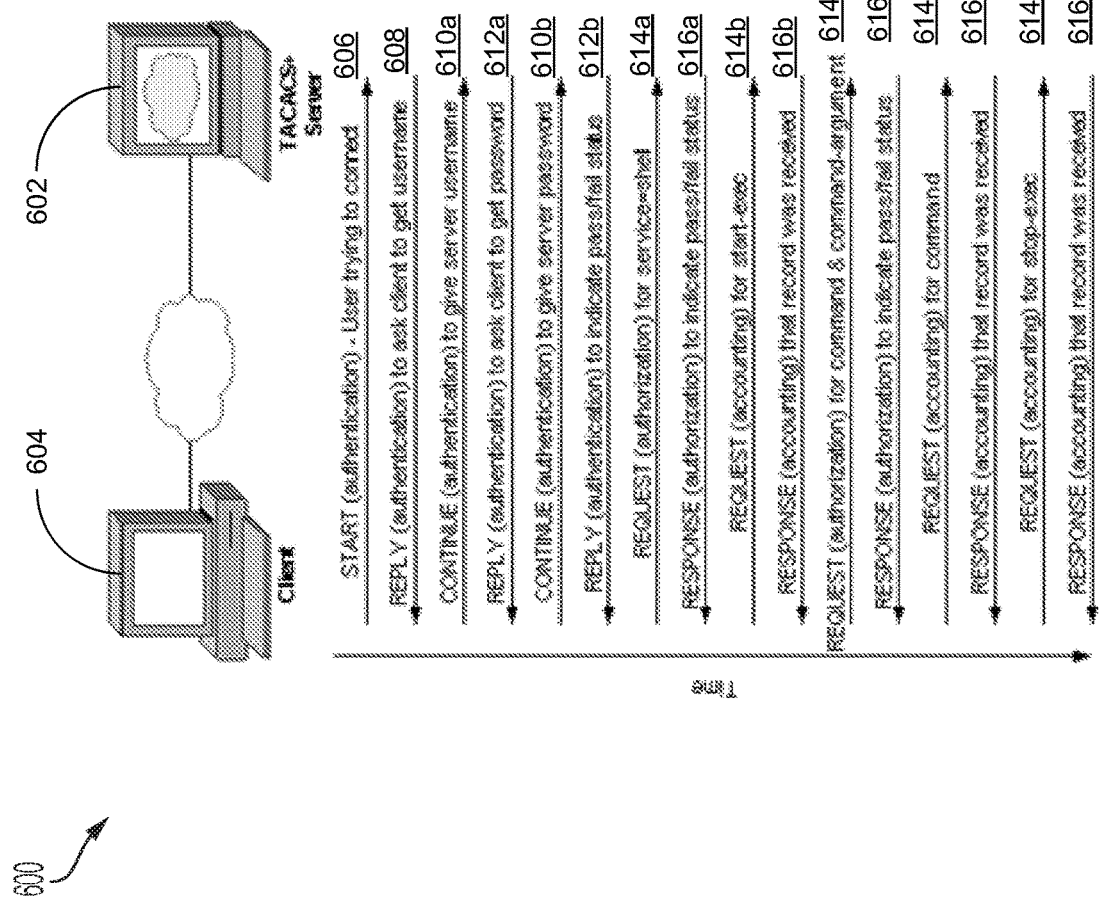
FIG. 6 illustrates an example system for determining a device trustworthiness using a Terminal Access Controller Access Control System Plus (TACACS+) protocol.

FIG. 6 illustrates a system 600 configured to support the TACACS+ protocol. A TACACS+ server 602 and a client 604 are shown in the system 600. The TACACS+ server 602 can include an access server that uses AAA protocol. The Terminal Access Controller Access Control System (TACACS) implementation of AAA includes various security features and utilizes a transport mechanism such as TCP. In some examples, the TACACS+ provides features such as per-command authorization. An example is a policy defined by a network administrator in which operators need to authenticate before accessing network devices and authorization is required for configuration changes.

In an illustrative example of traffic between the client and server for the TACACS+ protocol includes messages directed to login authentication, exec authorization, command authorization, start-stop exec accounting, and command accounting implemented with TACACS+ when a user Telnets to a router, performs a command, and exits the router. For example, a set of message exchanges can include a request to start (authentication) from the client 604 when a user tries to connect to the server, to which the TACACS+ server 602 can provide a reply (authentication) to ask the client 604 to obtain a username for the user. In the messages 610a-b, the client 604 can provide a message to continue (authentication) to provide the TACACS+ server 602 with the username, and the messages 612a-b can include replies to obtain the password and upon authentication, indicating whether the password passed or failed authentication. Once authenticated, the client 604 can provide various messages 614a-e for requesting a service and the TACACS+ server 602 can provide various responses 616a-e corresponding to the requests.

In some examples, the above-described messages exchanges or packets between the client 604 and the TACACS+ server 602 can be enhanced or new messages can be introduced to include attestation or Proof of Integrity. For example, the messages exchanged between the TACACS+ server 602 and the client 604 according to the TACACS+ protocol may be extended to carry Proof of Integrity and/or intent to validate proof of integrity. For example, the Proof of Integrity may include one or more of the visible indicators to determine whether a network device (e.g., the TACACS+ server 602 and/or the client 604) has been compromised. In various examples, the Proof of Integrity can include a Canary stamp, a hardware finger print, software, BIOS, runtime signatures, application binaries, or others. In some examples, the Proof of Integrity can additionally or alternatively include a signature using a private key such as a device identifier. In some examples, the Proof of Integrity may also be accompanied with a signature to prove freshness of the Proof of Integrity, e.g. by adding a signature over a random data/nonce presented by a peer. In some examples, the Proof of Integrity information may be added using a new set of type-length-values (TLVs) to the TACACS+ messages for authentication during the initial handshake (e.g., 606-612) or during the request and response messages (e.g., 614-616).

FIG. 7 illustrates a process 700 for authenticating network devices using attestation-based techniques (e.g., implemented in the systems 500, 600, etc.).

At step 702, the process 600 includes receiving, at a first node, one or more access control messages from a second node, the first node and the second node including network devices configured to communicate in a network. For example, the one or more access control messages can be based on a Remote Authentication Dial-In User Service (RADIUS) protocol, where the first node is the RADIUS server 502 and the second node is the client 504, or the first node is the client 504 and the second node is the RADIUS server 502. In another example, the one or more access control messages can be based on a Terminal Access Controller Access Control System Plus (TACACS+) protocol, where the first node is the TACACS+ server 602 and the second node is the client 604, or the first node is the client 604 and the second node is the TACACS+ server 602.

At step 704, the process 700 includes obtaining, by the first node, attestation information from one or more fields of the one or more access control messages. For example, the client 504 can obtain attestation information from one or more type-length-value (TLV) fields, extensions, or modifications to the one or more access control messages, where the one or more access control messages can include one or more of Access-Request, Access-Accept, Access-Challenge, Status-Server, or Status-Client messages (e.g., 506-516) for the RADIUS protocol, or the one or more messages 606-616 for the TACACS+ protocol.

At step 706, the process 700 includes determining, by the first node, whether the second node is authentic and trustworthy based on the attestation information. For example, where the attestation information can include Proof of Integrity based on one or more of a Canary stamp or a hardware fingerprint comprising Proof of Freshness of the one or more access control messages, a device identifier of the second node, or an attestation key.

In some implementations, hardware based crypto-processors (e.g., for hardware fingerprinting) can have scale and performance limitations in the number of attestation operations that can be performed (e.g., in a period of time such as per second). It is possible that the requests for obtaining such hardware based solutions from the crypto-processors can exceed the capacity of the crypto-processor. Accordingly in some implementations, the load on the crypto-processor can be adjusted as desired, e.g., to an acceptable and predictable level. In such implementations it is important to ensure that security and replay protection are not compromised.

In view of the above, determining freshness (e.g., at the first node) can be based on a signed result received from a server. The server can receive one or more responses from a set of one or more client devices (including the first node), each of the one or more responses comprising a random number which is unpredictable by the server. A set of random numbers comprising one or more random numbers obtained from the one or more responses can be combined into a single nonce and the single nonce can be passed through a crypto-processor to obtain a signed result comprising at least the single nonce. Each of the one or more client devices can receive the signed result based on the single nonce, which can allow them to determine freshness of the signed result. In some examples, combining random numbers can include using an algorithm such as a Bloom Filter applied to support the scaling and replay protection goals mentioned above. A Bloom Filter can algorithmically combine a recent set of nonces provided by the client devices into a single number which then can be processed by a crypto-processor on the server. For example, the input to the crypto-processor for a current time window can include a hash of all the nonces received during a previous time window, where the Bloom Filter can implement the hash. In some examples, the hash can replace the nonce. When the signed attestation from the crypto-processor is returned to a client, the client can then verify that its particular nonce was included within the result captured by the Bloom Filter.

Figure 8:
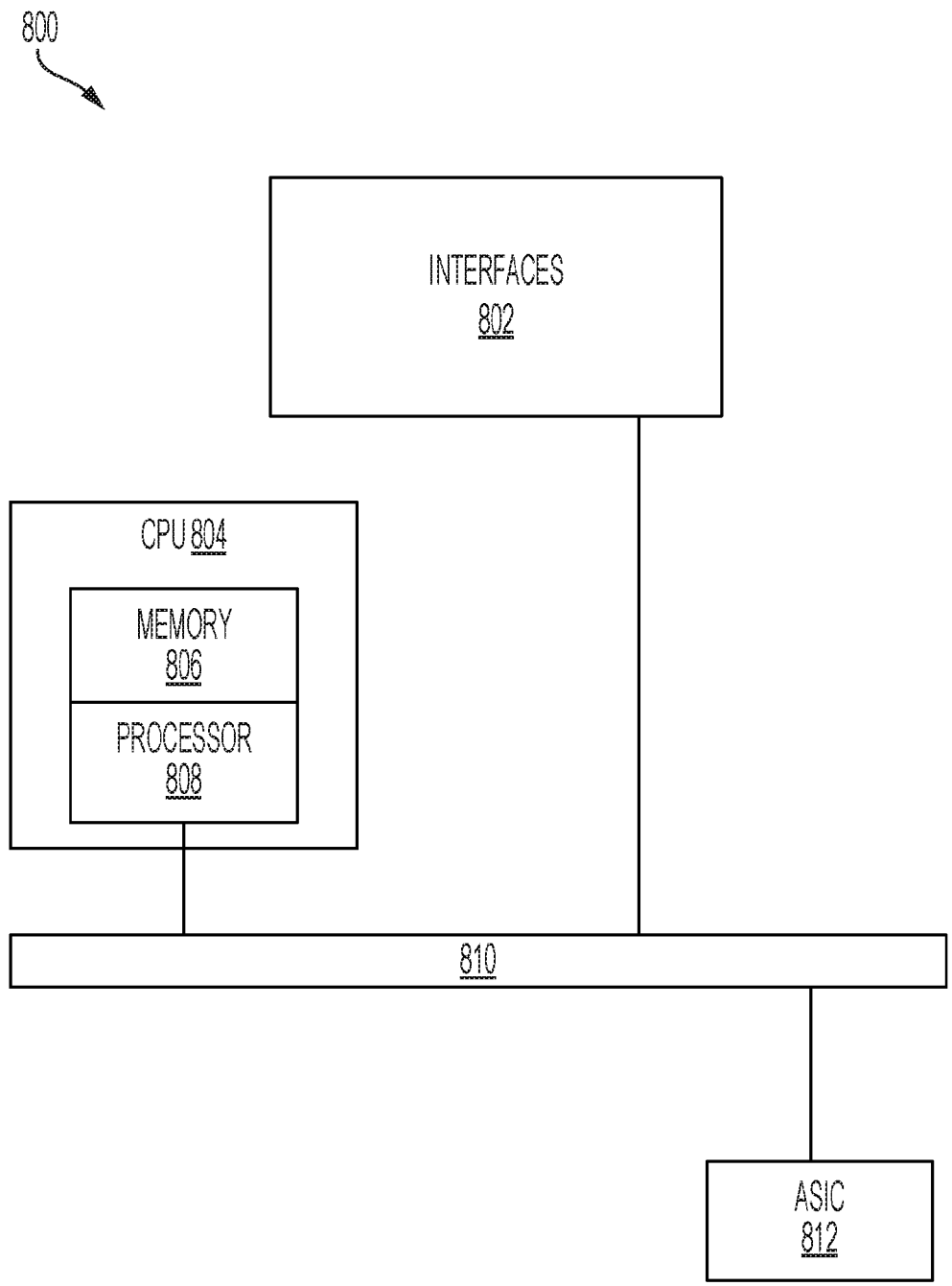
FIG. 8 illustrates an example network device in accordance with some examples.
Figure 9:
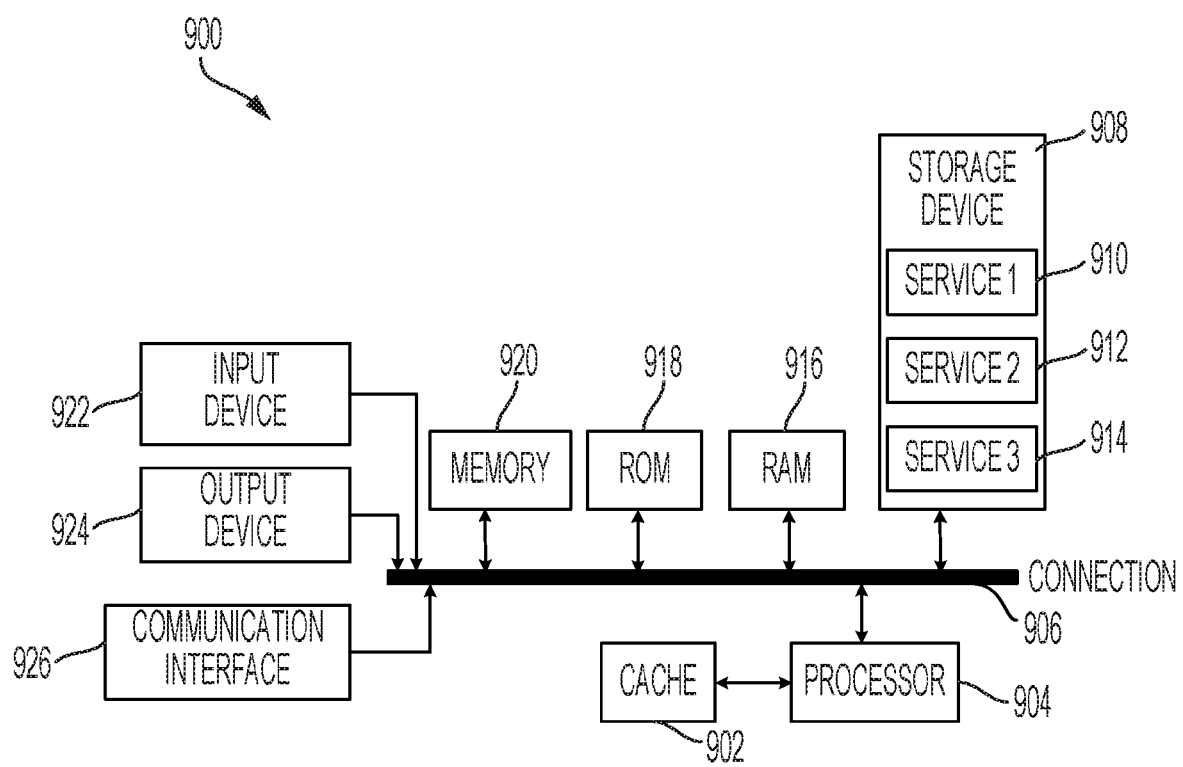
FIG. 9 illustrates an example computing device architecture in accordance with some examples.

The disclosure now turns to FIGS. 8 and 9, which illustrate example network nodes and computing devices, such as switches, routers, client devices, endpoints, servers, and so forth.

FIG. 8 illustrates an example network device 800 suitable for performing switching, routing, and other networking operations. Network device 800 includes a central processing unit (CPU) 804, interfaces 802, and a connection 810 (e.g., a PCI bus). When acting under the control of appropriate software or firmware, the CPU 804 is responsible for executing packet management, error detection, and/or routing functions. The CPU 804 can accomplish these functions under the control of software including an operating system and any appropriate applications software. CPU 804 may include one or more processors 808, such as a processor from the INTEL X86 family of microprocessors. In some cases, processor 808 can be specially designed hardware for controlling the operations of network device 800. In some cases, a memory 806 (e.g., non-volatile RAM, ROM, etc.) also forms part of CPU 804. However, there are many different ways in which memory could be coupled to the system.

The interfaces 802 are typically provided as modular interface cards (sometimes referred to as "line cards"). Generally, they control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 804 to efficiently perform routing computations, network diagnostics, security functions, etc.

Although the system shown in FIG. 8 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 800.

Regardless of the network device's configuration, it may employ one or more memories or memory modules (including memory 806) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 806 could also hold various software containers and virtualized execution environments and data.

The network device 800 can also include an application-specific integrated circuit (ASIC) 812, which can be configured to perform routing and/or switching operations. The ASIC 812 can communicate with other components in the network device 800 via the connection 810, to exchange data and signals and coordinate various types of operations by the network device 800, such as routing, switching, and/or data storage operations, for example.

FIG. 9 illustrates a computing system architecture 900 including various components in electrical communication with each other using a connection 906, such as a bus. Example system architecture 900 includes a processing unit (CPU or processor) 904 and a system connection 906 that couples various system components including the system memory 920, such as read only memory (ROM) 918 and random access memory (RAM) 916, to the processor 904. The system architecture 900 can include a cache 902 of high-speed memory connected directly with, in close proximity to, or integrated as part of the processor 904. The system architecture 900 can copy data from the memory 920 and/or the storage device 908 to the cache 902 for quick access by the processor 904. In this way, the cache can provide a performance boost that avoids processor 904 delays while waiting for data. These and other modules can control or be configured to control the processor 904 to perform various actions.

Other system memory 920 may be available for use as well. The memory 920 can include multiple different types of memory with different performance characteristics. The processor 904 can include any general purpose processor and a hardware or software service, such as service 1 910, service 2 912, and service 3 914 stored in storage device 908, configured to control the processor 904 as well as a special-purpose processor where software instructions are incorporated into the actual processor design. The processor 904 may be a completely self-contained computing system, containing multiple cores or processors, a bus, memory controller, cache, etc. A multi-core processor may be symmetric or asymmetric.

To enable user interaction with the computing system architecture 900, an input device 922 can represent any number of input mechanisms, such as a microphone for speech, a touch-sensitive screen for gesture or graphical input, keyboard, mouse, motion input, speech and so forth. An output device 924 can also be one or more of a number of output mechanisms known to those of skill in the art. In some instances, multimodal systems can enable a user to provide multiple types of input to communicate with the computing system architecture 900. The communications interface 926 can generally govern and manage the user input and system output. There is no restriction on operating on any particular hardware arrangement and therefore the basic features here may easily be substituted for improved hardware or firmware arrangements as they are developed.

Storage device 908 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 916, read only memory (ROM) 918, and hybrids thereof.

The storage device 908 can include services 910, 912, 914 for controlling the processor 904. Other hardware or software modules are contemplated. The storage device 908 can be connected to the system connection 906. In one aspect, a hardware module that performs a particular function can include the software component stored in a computer-readable medium in connection with the necessary hardware components, such as the processor 904, connection 906, output device 924, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

The invention claimed is:

1. A method comprising:
   receiving, at a first node, one or more messages associated with a second node, the first node and the second node including network devices configured to communicate in a network;
   obtaining, by the first node, attestation information from one or more fields of the one or more messages, the attestation information comprising at least one of proof of integrity data associated with the second node and proof-of-transit (POT) data identifying each hop traversed by the one or more messages and indicating an integrity of each hop traversed by the one or more messages; and
   based on the attestation information, determining, by the first node, at least one of a reliability of the one or more messages, an integrity associated with the second node, and the integrity of each hop traversed by the one or more messages.

2. The method of claim 1, wherein the integrity indicated by the POT data comprises an indication of at least one of an authenticity of each hop traversed by the one or more messages and a trustworthiness of each hop traversed by the one or more messages.

3. The method of claim 1, wherein determining the integrity associated with the second node comprises determining at least one of an authenticity of the second node and a trustworthiness of the second node.

4. The method of claim 1, further comprising:
receiving one or more responses from one or more network devices, each of the one or more responses comprising a random number;
combining a set of random numbers from the one or more responses into a single nonce; and
based on the single nonce, generating a signed result comprising the single nonce signed by the crypto-processor.

5. The method of claim 4, further comprising: determining a freshness of the signed result based on the single nonce.

6. The method of claim 1, wherein the one or more messages are based on a remote authentication dial-in user service (RADIUS) protocol, wherein the first node comprises one of a client or a server, and wherein the second node comprises a different one of the client or the server.

7. The method of claim 1, wherein the one or more messages are based on a terminal access controller access control system plus (TACACS+) protocol, wherein the first node comprises one of a client or a server, and wherein the second node comprises a different one of the client or the server.

8. The method of claim 1, wherein the attestation information comprises proof-of-integrity data based on at least one of metadata comprising a canary stamp, a hardware fingerprint, a proof-of-freshness of the one or more messages, a device identifier of the second node, and an attestation key.

9. The method of claim 1, wherein the one or more fields comprise at least one of a type-length-value (TLV) field, an extension, and a modification to the one or more messages.

10. A system comprising:
one or more processors; and
at least one non-transitory computer-readable storage medium containing instructions which, when executed by the one or more processors, cause the one or more processors to:
receiving one or more messages associated with a node in a network;
obtain attestation information from one or more fields of the one or more messages, the attestation information comprising at least one of proof of integrity data associated with the node and proof-of-transit (POT) data identifying each hop traversed by the one or more messages and indicating an integrity of each hop traversed by the one or more messages; and
based on the attestation information, determine at least one of a reliability of the one or more messages, an integrity associated with the node, and the integrity of each hop traversed by the one or more messages.

11. The system of claim 10, wherein the integrity indicated by the POT data comprises an indication of at least one of an authenticity of each hop traversed by the one or more messages and a trustworthiness of each hop traversed by the one or more messages.

12. The system of claim 10, wherein determining the integrity associated with the node comprises determining at least one of an authenticity of the node and a trustworthiness of the node.

13. The system of claim 10, wherein the at least one non-transitory computer-readable storage medium contains instructions which, when executed by the one or more processors, cause the one or more processors to:
receive one or more responses from one or more network devices, each of the one or more responses comprising a random number;
combine a set of random numbers from the one or more responses into a single nonce; and
based on the single nonce, generate a signed result comprising the single nonce signed by a crypto-processor.

14. The system of claim 13, wherein the at least one non-transitory computer-readable storage medium contains instructions which, when executed by the one or more processors, cause the one or more processors to: determine a freshness of the signed result based on the single nonce.

15. The system of claim 10, wherein the one or more messages are based on a remote authentication dial-in user service (RADIUS) protocol, wherein the system comprises one of a client or a server, and wherein the node comprises a different one of the client or the server.

16. The system of claim 10, wherein the one or more messages are based on a terminal access controller access control system plus (TACACS+) protocol, wherein the system comprises one of a client or a server, and wherein the node comprises a different one of the client or the server.

17. The system of claim 10, wherein the attestation information comprises proof-of-integrity data based on at least one of metadata comprising a canary stamp, a hardware fingerprint, a proof-of-freshness of the one or more messages, a device identifier of the node, and an attestation key.

18. The system of claim 10, wherein the one or more fields comprise at least one of a type-length-value (TLV) field, an extension, and a modification to the one or more messages.

19. At least one non-transitory machine-readable medium containing instructions which, when executed by one or more processors of a first node, cause the first node to:
receive one or more messages associated with a second node in a network, the first node and the second node including network devices configured to communicate in a network;
obtain attestation information from one or more fields of the one or more messages, the attestation information comprising at least one of proof of integrity data associated with the second node and proof-of-transit (POT) data identifying each hop traversed by the one or more messages and indicating an integrity of each hop traversed by the one or more messages; and
based on the attestation information, determine at least one of a reliability of the one or more messages, an integrity associated with the second node, and the integrity of each hop traversed by the one or more messages.

20. The at least one non-transitory machine-readable medium of claim 19, wherein the integrity indicated by the POT data comprises an indication of at least one of an authenticity of each hop traversed by the one or more messages and a trustworthiness of each hop traversed by the one or more messages, and wherein determining the integrity associated with the second node comprises determining at least one of an authenticity of the second node and a trustworthiness of the second node.

* * * * *